(12) United States Patent
Garrett et al.

(10) Patent No.: US 8,595,723 B2
(45) Date of Patent: Nov. 26, 2013

(54) METHOD AND APPARATUS FOR CONFIGURING A HYPERVISOR DURING A DOWNTIME STATE

(75) Inventors: Michael R. Garrett, Cypress, TX (US); Thomas J. Bonola, Cypress, TX (US); Mike Dickson, Magnolia, TX (US); John M. Hemphill, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 366 days.

(21) Appl. No.: 12/997,002

(22) PCT Filed: Jun. 10, 2008

(86) PCT No.: PCT/US2008/066417
§ 371 (c)(1),
(2), (4) Date: Dec. 9, 2010

(87) PCT Pub. No.: WO2009/151445
PCT Pub. Date: Dec. 17, 2009

(65) Prior Publication Data
US 2011/0088032 A1    Apr. 14, 2011

(51) Int. Cl.
*G06F 9/455* (2006.01)
*G06F 9/00* (2006.01)
*G06F 1/00* (2006.01)

(52) U.S. Cl.
USPC ............... 718/1; 713/2; 713/100; 713/324; 713/340

(58) Field of Classification Search
USPC ............................. 718/1–105; 713/1–2, 100
See application file for complete search history.

(56) References Cited

U.S. PATENT DOCUMENTS

| 5,535,399 | A | 7/1996 | Blitz et al. |
| 7,065,761 | B2* | 6/2006 | Foster et al. ................ 718/100 |
| 7,171,548 | B2 | 1/2007 | Smith et al. |
| 8,171,174 | B2* | 5/2012 | Lambert et al. ............. 709/250 |
| 2004/0003063 | A1* | 1/2004 | Ashok et al. ................. 709/221 |
| 2004/0215948 | A1* | 10/2004 | Abbey et al. ..................... 713/1 |
| 2007/0028244 | A1 | 2/2007 | Landis et al. |
| 2007/0226481 | A1* | 9/2007 | Duncan ............................ 713/2 |
| 2008/0005748 | A1* | 1/2008 | Mathew et al. ............... 719/318 |
| 2009/0276607 | A1* | 11/2009 | Bonola ........................ 712/209 |
| 2009/0276772 | A1* | 11/2009 | Garrett et al. ..................... 718/1 |
| 2010/0318993 | A1* | 12/2010 | Goud et al. ....................... 718/1 |

OTHER PUBLICATIONS

International Search Report and Written Opinion, dated Feb. 26, 2009, 12 pages.

* cited by examiner

*Primary Examiner* — Abdullah Al Kawsar

(57) ABSTRACT

In one embodiment, a computer system comprises a host machine comprising a plurality of compute resources, at least one management processor, a hypervisor, at least one persistent state data store location coupled to the host machine, wherein the persistent state data store location stores configuration data for the hypervisor, and a persistent state module coupled to a management processor coupled to the host machine, wherein the persistent state module maps hypervisor configuration data to a persistent state data store.

19 Claims, 7 Drawing Sheets

METHOD AND APPARATUS FOR CONFIGURING A HYPERVISOR DURING A DOWNTIME STATE

BACKGROUND

This application relates to electronic computing and more particularly to configuration information in virtual computing systems.

High-end computer systems which support partitioning of the server to smaller systems running multiple instances of Operating Systems (OS) are gaining acceptance. Existing systems support two types of partitioning mechanisms: hard partitions and virtual partitions.

Hard partitions are electrically isolated and have their own central processing unit (CPU), memory and input/output (I/O) resources. Hardware faults in these partitions are self contained and do not affect the other partitions within the same server complex. Resources available within a hard partition can be expanded dynamically by adding more resources, e.g., CPUs, memory and I/O slots. Hard partitions may be expanded by adding a group of CPUs, memory and I/O to the existing partition.

Virtual partitions are software-created partitions. Virtual partitions share computing resources within an existing system (or hard partition) and are implemented via a low level partition manager (or monitor), which controls both the allocation and visibility of computing resources to different instances of operating systems executing on the different virtual partitions. These partitions provide software fault isolation across OS instances. Likewise, it is possible to allocate and/or constrain computing resources between the virtual partitions of an existing system (or hard partition).

In some partitioned computer systems a host system executes a software module, referred to herein as a hypervisor, which fulfills the role of a low level partition manager or monitor in the management of computing resources. This hypervisor allows users to instantiate virtual machines, which present themselves to the virtual machine host as physical servers.

Currently, hypervisors are managed as one would manage any operating system or software loaded onto physical computer system hardware. Under this structure the hypervisor configuration settings may only be managed when the hypervisor is booted and running. From a user's perspective, a hypervisor could be considered to be an extension of the computer system hardware itself, rather than software running on the hardware, and should be able to be managed as such.

DETAILED DESCRIPTION

Described herein are exemplary systems and methods for modifying hypervisor configuration settings in virtual computing systems. The methods described herein may be embodied as logic instructions on a computer-readable medium. When executed on one or more processor(s), the logic instructions cause the processor(s) to be programmed as a special-purpose machine that implements the described methods. The processor(s), when configured by the logic instructions to execute the methods recited herein, constitutes structure for performing the described methods.

Figure 1:
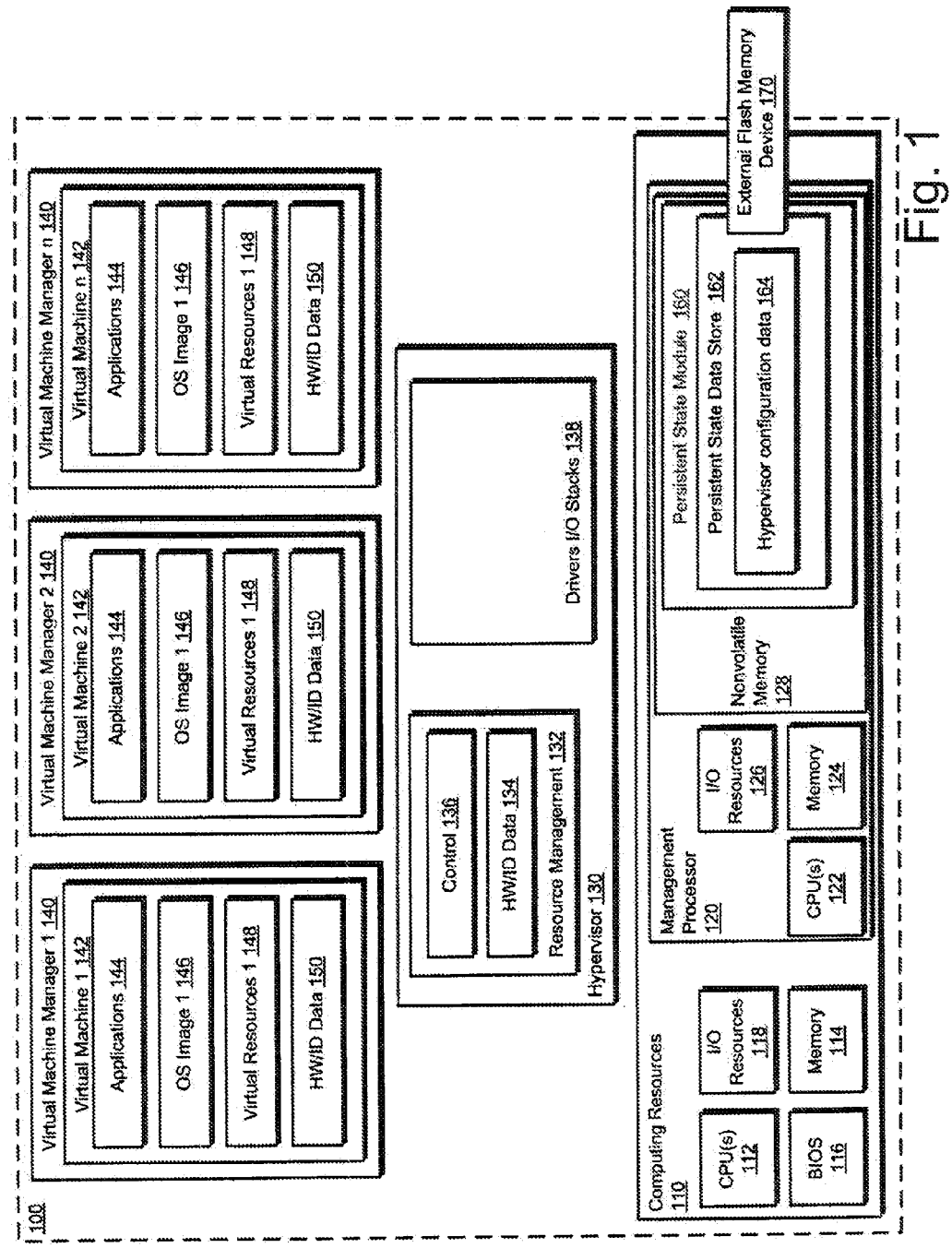
FIG. 1 is a schematic illustration of a computer system with hypervisors, according to embodiments.

FIG. 1 is a schematic illustration of a virtualized computer system, according to embodiments. Referring to FIG. 1, system 100 comprises host machine computing resources 110, which includes at least one CPU 112, system memory 114, an SMBIOS 116, and input/output resources 118.

A hypervisor 130 executes on host machine computing resources 110. In some embodiments, hypervisor 130 is embodied as a software module having logic including drivers and input/output stacks 138 which enables the system 100 to instantiate at least one virtual machine 142 and which manages the underlying host machine computing resources 110 to enable the virtual machines to utilize the resources in a virtual fashion. In practice, hypervisor 130 may instantiate any number of virtual machines 142 to execute on the system 100. In the embodiment depicted in FIG. 1, three virtual machines are depicted, i.e., virtual machine 1, virtual machine 2, and virtual machine n.

Each virtual machine 140 comprises virtual resources 148, an operating system image 146, and may execute one or more applications 144. Virtual machines executing on the system 100 may instantiate different operating systems. For example, virtual machine one 142 may instantiate a UNIX operating system while virtual machine to 140 may instantiate a Windows based operating system. As described above, the physical host machine compute resources 110 are managed by the hypervisor 130 to provide each virtual machine 142 with virtual resources 148. Thus, the virtual resources 148 may be modified dynamically to compensate for changes in the operating environment of each virtual machine 142.

In one embodiment, hypervisor 130 may further include a resource management module 132 which includes a control module 136. Control module 136 may be embodied as logic which, when executed on a processor such as CPU 112, checks for current hypervisor configuration settings on the host machine, for example in persistent state data store.

Figure 2:
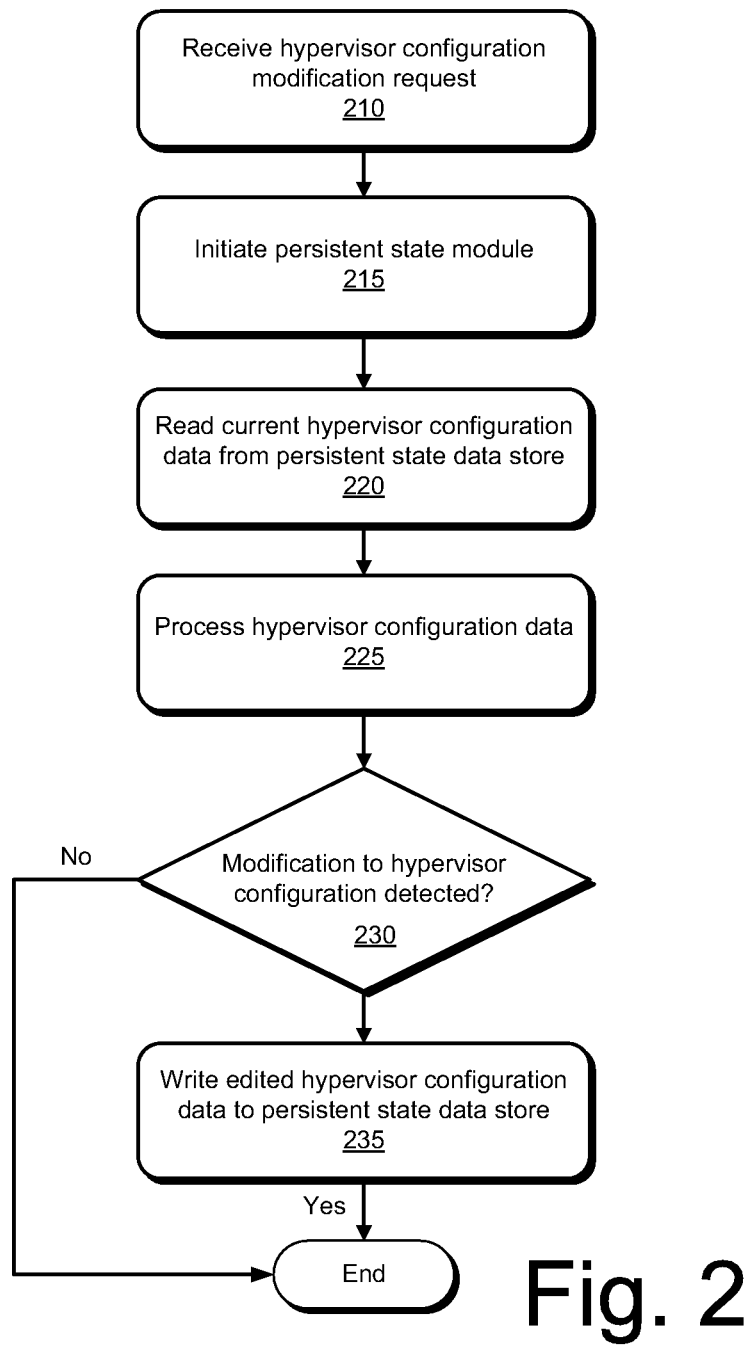
FIG. 2 is a flowchart illustrating operations associated with modifying hypervisor configuration settings, according to some embodiments.
Figure 3:
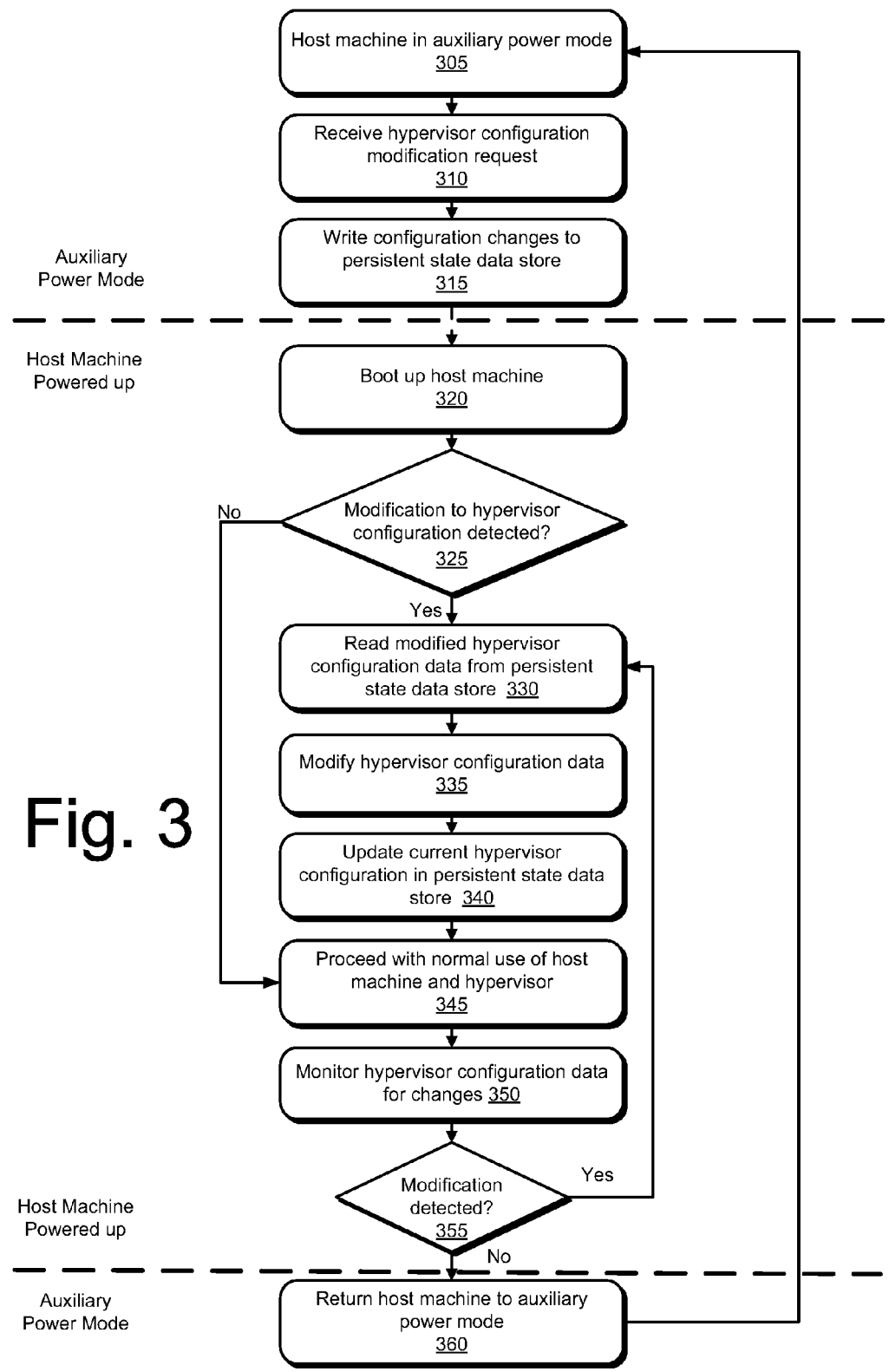
FIG. 3 is a flowchart illustrating operations associated with modifying hypervisor configuration settings, according to some embodiments.

Furthermore, the logic to check for current hypervisor configuration settings on the system 100 may also be implemented in a management processor 120 which is separate from the hypervisor 130. Thus, in the embodiment depicted in FIG. 1, the system 100 comprises a management processor 120 having CPUs 122, memory 124, I/O resources and nonvolatile memory 128 comprising a persistent state module 160. Management processor 120 may operate alone or in conjunction with hypervisor 130. FIGS. 2-3 illustrate operations implemented by elements of the system 100 to modify configuration data for at least one hypervisor operating on the system 100.

System 100 further comprises a persistent state module 160. In some embodiments, the persistent state module 160 may be located in the nonvolatile memory 128. Persistent state module 160 may be embodied as logic which, when executed on a processor such as CPU 112, extracts hypervisor configuration data 164 from the persistent state data store 162 to provide configuration settings for the hypervisor 130 on the system 100.

In some embodiments, the persistent state module 160 may exist in many locations on a system 100 such as NVRAM, ROM, Flash sectors, USB Flash media, SD cards or the like. Among other components, a persistent state module 160 comprises persistent state data store 162, and hypervisor configuration data 164 settings for the hypervisor on the system 100. In some embodiments, the persistent state data store 162 may be located on the management processor's 120 nonvolatile memory 128, a USB Flash media key, a SD card located inside the host machine or the like. In operation, a hypervisor may be considered analogous to hardware of the system 100 from a user's perspective. In such embodiments, management of hypervisor configuration data 164 settings may be performed with the same level of capability that one may manage physical hardware. These abilities may include but are not limited to, the ability to configure hypervisors remotely from a management console even when the system is running in auxiliary power mode, and the ability to physically tie hypervisor configuration settings to the system memory.

In some embodiments, the hypervisor configuration data 164 may be mapped directly to the nonvolatile memory 128. In such embodiments, the hypervisor configuration data is formatted as to allow modification of configuration settings while a system 100 is in auxiliary power mode. Furthermore, the configuration data may be modified in auxiliary power mode because the management processor 120 baseboard management controller (BMC) Integrated Lights-Out (iLO) runs in auxiliary power regardless of the system's 100 power state (ON/OFF). In the context of this invention, "auxiliary power mode" means the iLO subsystem is on a separate power domain than the host machine upon which it runs and therefore, a powered-off host machine may still have its configuration information modified through iLO as the persistent state module resides on the iLO power domain within the server. In operation, the following hypervisor configuration items may be of interest. Creating, deleting, editing the VMs values for; name, description, serial number, universal unique identifier (UUID), default power state, memory configuration, CPU configuration, PXE configuration, boot order or the like. Adding, deleting, editing NIC values such as name, network, mac or the like. Adding, deleting, editing storage controller values such as name, virtual disk image name, bootable, writeable, CD/DVD versus hard drive. In the context of configuration values pertaining to networks, all networks may be created and managed under the hypervisor, other components can only reference them by name. In the context of configuration values pertaining to virtual disk images, all virtual disk images may be created and managed under the hypervisor, other components can only reference them by name. Finally, configuration values pertaining to physical resource reservations such as: CPUs an integrated hypervisor may use, the range of memory an integrated hypervisor must ignore, the range of PCI BDF an integrated hypervisor must ignore, and the range of I/O ports an integrated hypervisors must not virtualize in DOM0.

In some embodiments, the persistent state module may accept inputs from a user introducing an external flash media device 170. In such embodiments, the user may introduce modified hypervisor configuration settings stored on the external flash media device 170. This introduction of hypervisor configuration data modifications, by a user, may be performed when the system 100 is in an auxiliary power mode. In some embodiments, a Flash device may contain hypervisor configuration data in a persistent state specific format. In some embodiments, the persistent state module on the management processor may grant priority to hypervisor configuration data introduced on an external flash media in establishing configuration settings over current embedded settings.

FIGS. 2-3 illustrate operations implemented by elements of the system 100 to modify hypervisor configuration settings. FIG. 2 is a flowchart illustrating operations associated with modifying hypervisor configuration settings, according to some embodiments. In some embodiments, the operations depicted in FIG. 2 may be implemented by the persistent state module 160 of the system 100.

Referring to FIG. 2, at operation 210 a host machine receives a hypervisor configuration modification request. In some embodiments, this request may be received while the host machine is in an auxiliary power mode. In such embodiments, the request would go to the management processor 120 operating on auxiliary power. By contrast, if the host machine power is on and the hypervisor is operating, the request would go directly to the hypervisor 130. In some embodiments this request may be presented by a user, external software or the like.

At operation 215 a persistent state module 160 on the management processor 120 is initiated in the system 100. In some embodiments, the persistent state module 160 is initiated by introduction of a request by a user, external software or the like.

At operation 220 the hypervisor configuration data stored in the persistent state data store is read. In some embodiments, the persistent state data store 162 is read by the hypervisor 130 as it starts up.

At operation 225 the hypervisor configuration data is processed. In some operations, the persistent state module 160 on the management processor 120 may process the modifications and thereby allow the hypervisor 130 to retrieve the configuration settings.

At operation 230, if a modification to the hypervisor configuration data 164 settings has been detected, then at operation 235 the edited hypervisor configuration data 164 is written to the persistent state data store 162. In some embodiments, the persistent state module 160 on the management processor 120 performs the task of writing the modified hypervisor configuration data 164 settings to the persistent state data store 162.

By contrast, if at operation 230, no modifications have been detected then the host machine and hypervisor continue use as normal. In some embodiments, a hypervisor may monitor the persistent state data store 162 for possible modifications to the hypervisor configuration data 164 while the host machine is in a powered up mode.

FIG. 3 is a flowchart illustrating operations associated with modifying hypervisor configuration settings, according to some embodiments. Referring to FIG. 3, at operation 305 a host machine may be in auxiliary power mode. In some embodiments, a user or the like may wish to modify hypervisor configuration settings without fully booting the home machine. In such embodiments, a user or the like may present a hypervisor configuration modification request to a host machine. This request may be made through remote management, from the addition of an external flash media device to the host machine or the like.

At operation 310, the system 100 receives a hypervisor configuration modification request. In some embodiments, the request is received by the persistent state module 160. While the host machine is in auxiliary power mode, the hypervisor configuration modification request may prompt the persistent state module 160 to write the hypervisor configuration modifications to the persistent state data store 162 on the host machine at operation 315.

At some time during the use of a host machine, the host machine may be powered up. At operation 320, the host machine may be booted up. In some embodiments, during the boot process the persistent state module 160 on the management processor 120 may monitor the persistent state data store 162 for changes in the hypervisor configuration data 164 settings. The persistent state module 160 may perform this check during the boot process and periodically during normal functioning of the host machine.

If, at operation 325 a modification to the hypervisor configuration data is detected then at operation 330 the modification is read. In some embodiments, the hypervisor 130 reads the modified hypervisor configuration data 164 from the persistent state data store 162.

By contrast, if at operation 335 no modification to the hypervisor configuration data 164 is detected, then the hypervisor 130 reads the current hypervisor configuration data 164 and host machine may proceed with normal functioning at operation 345. In some embodiments, due to the nature of the storage media for persistent state data, writers including the hypervisor should avoid unnecessary writes and should only rewrite if there has been a configuration change. These policies may be enforced by the persistent state module 160 in the system 100.

At operation 335, hypervisor configuration data 164 is modified. In some embodiments this process is performed by the persistent state module 160 on the management processor 120. In some embodiments, the process is performed by the hypervisor 130. In some embodiments, the hypervisor configuration data 164 is stored and directly mapped to the nonvolatile memory 128, thereby allowing the hypervisor configuration data 164 settings to be treated analogously to system hardware.

At operation 340, the modified hypervisor configuration data 164 is returned to its storage site thereby updating the current hypervisor configuration settings on the host machine. In some embodiments, the hypervisor configuration data is stored in the persistent state data store 162 on the nonvolatile memory 128.

After hypervisor configuration data settings have been updated, the system may continue with normal use (at operation 345). At operation 350, during normal functioning of the host machine, the hypervisor 130 may monitor the persistent state data store 162 for possible configuration modifications. If at operation 355 a modification is detected, then the configuration modifications are processed at operation 330. By contrast, if at operation 355 no modifications are detected, the hypervisor continues to monitor until the home machine is returned to an auxiliary power mode. At operation 360, the system 100 may be returned to auxiliary power mode at some later point in time.

Thus, the operations depicted in FIGS. 2-3 enable a user to modify a hypervisor configuration settings, such as one of the hypervisor 130 in computer system 100, configuration data associated with the underlying components of the host machine.

Figure 4:
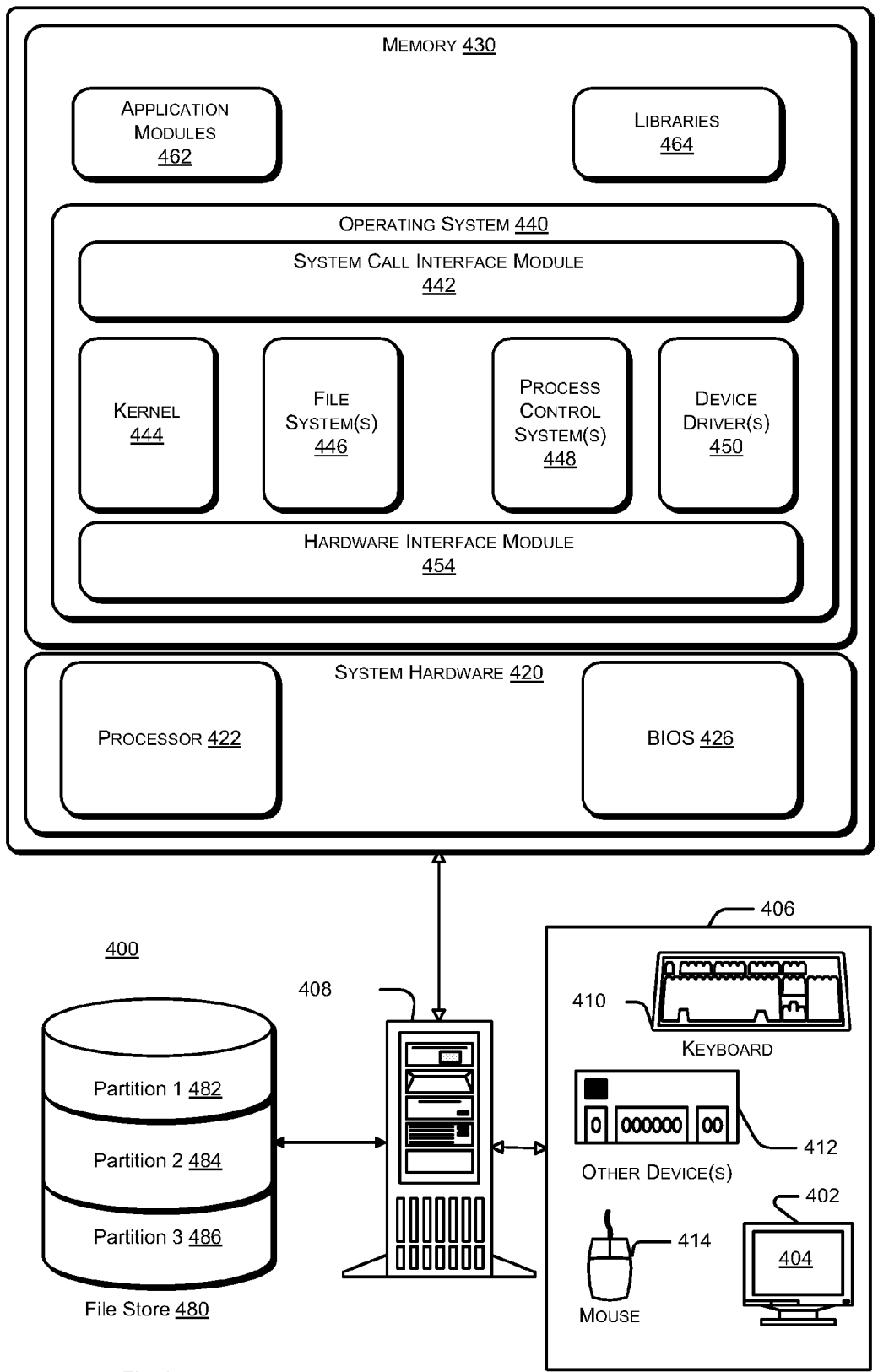
FIG. 4 is a schematic illustration of a computing system, according to an embodiment.

In some embodiments, the computer system 100 may be embodied as a server system. FIG. 4 is a schematic illustration of a computing system, according to an embodiment. The components shown in FIG. 4 are only examples, and are not intended to suggest any limitation as to the scope of the functionality of the display assembly; the current invention is not necessarily dependent on the features shown in FIG. 4. In the illustrated embodiment, computer system 400 may be embodied as a hand-held or stationary device for accessing the Internet, a desktop PCs, notebook computer, personal digital assistant, or any other processing devices that have a basic input/output system (BIOS) or equivalent.

The computing system 400 includes a computer 408 and one or more accompanying input/output devices 406 including a display 402 having a screen 404, a keyboard 410, other I/O device(s) 412, and a mouse 414. The other device(s) 412 may include, for example, a touch screen, a voice-activated input device, a track ball, and any other device that allows the system 400 to receive input from a developer and/or a user.

The computer 408 includes system hardware 420 commonly implemented on a motherboard and at least one auxiliary circuit boards. System hardware 420 including a processor 422 and a basic input/output system (BIOS) 426. BIOS 426 may be implemented in flash memory and may comprise logic operations to boot the computer device and a power-on self-test (POST) module for performing system initialization and tests. In operation, when activation of computing system 400 begins processor 422 accesses BIOS 426 and shadows the instructions of BIOS 426, such as power-on self-test module, into operating memory. Processor 422 then executes power-on self-test operations to implement POST processing.

Computer system 400 further includes a file store 480 communicatively connected to computer 408. File store 480 may be internal such as, e.g., one or more hard drives, or external such as, e.g., one or more external hard drives, network attached storage, or a separate storage network. In some embodiments, the file store 480 may include one or more partitions 482, 484, 486.

Memory 430 includes an operating system 440 for managing operations of computer 408. In one embodiment, operating system 440 includes a hardware interface module 454 that provides an interface to system hardware 420. In addition, operating system 440 includes a kernel 444, one or more file systems 446 that manage files used in the operation of computer 408 and a process control subsystem 448 that manages processes executing on computer 408. Operating system 440 further includes one or more device drivers 450 and a system call interface module 442 that provides an interface between the operating system 440 and one or more application modules 462 and/or libraries 464. The various device drivers 450 interface with and generally control the hardware installed in the computing system 400.

In operation, one or more application modules 462 and/or libraries 464 executing on computer 408 make calls to the system call interface module 442 to execute one or more commands on the computer's processor. The system call interface module 442 invokes the services of the file systems 446 to manage the files required by the command(s) and the process control subsystem 448 to manage the process required by the command(s). The file system(s) 446 and the process control subsystem 448, in turn, invoke the services of the hardware interface module 454 to interface with the system hardware 420. The operating system kernel 444 can be generally considered as one or more software modules that are responsible for performing many operating system functions.

Figures 5A, 5B:
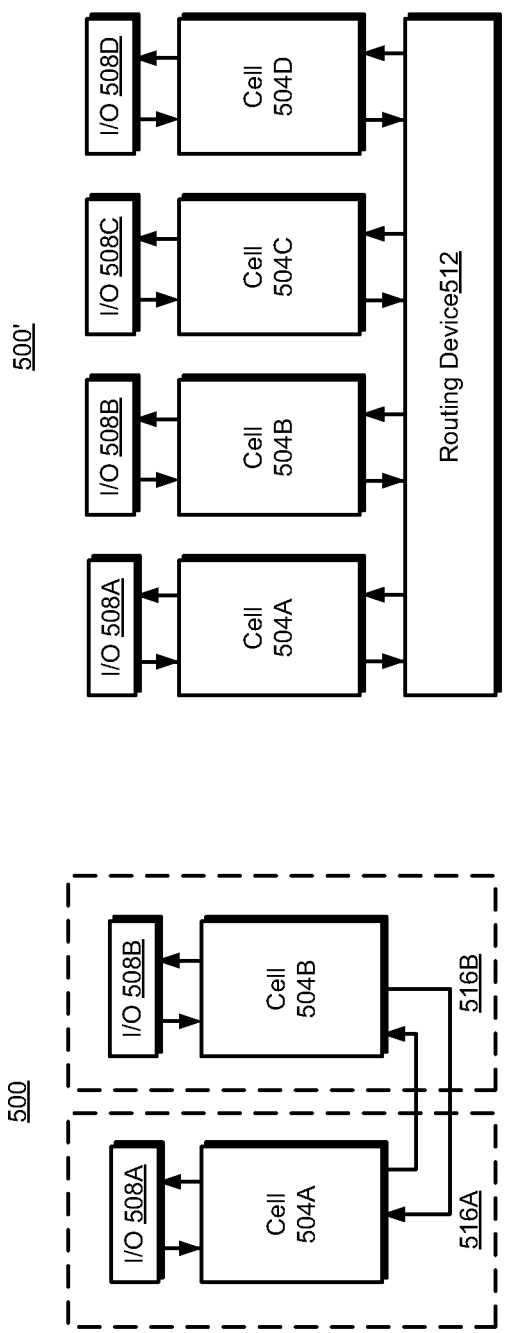
FIGS. 5A, 5B and 5C are schematic illustrations of one embodiment of a multiprocessor computer system according to embodiments.
Figure 5C:
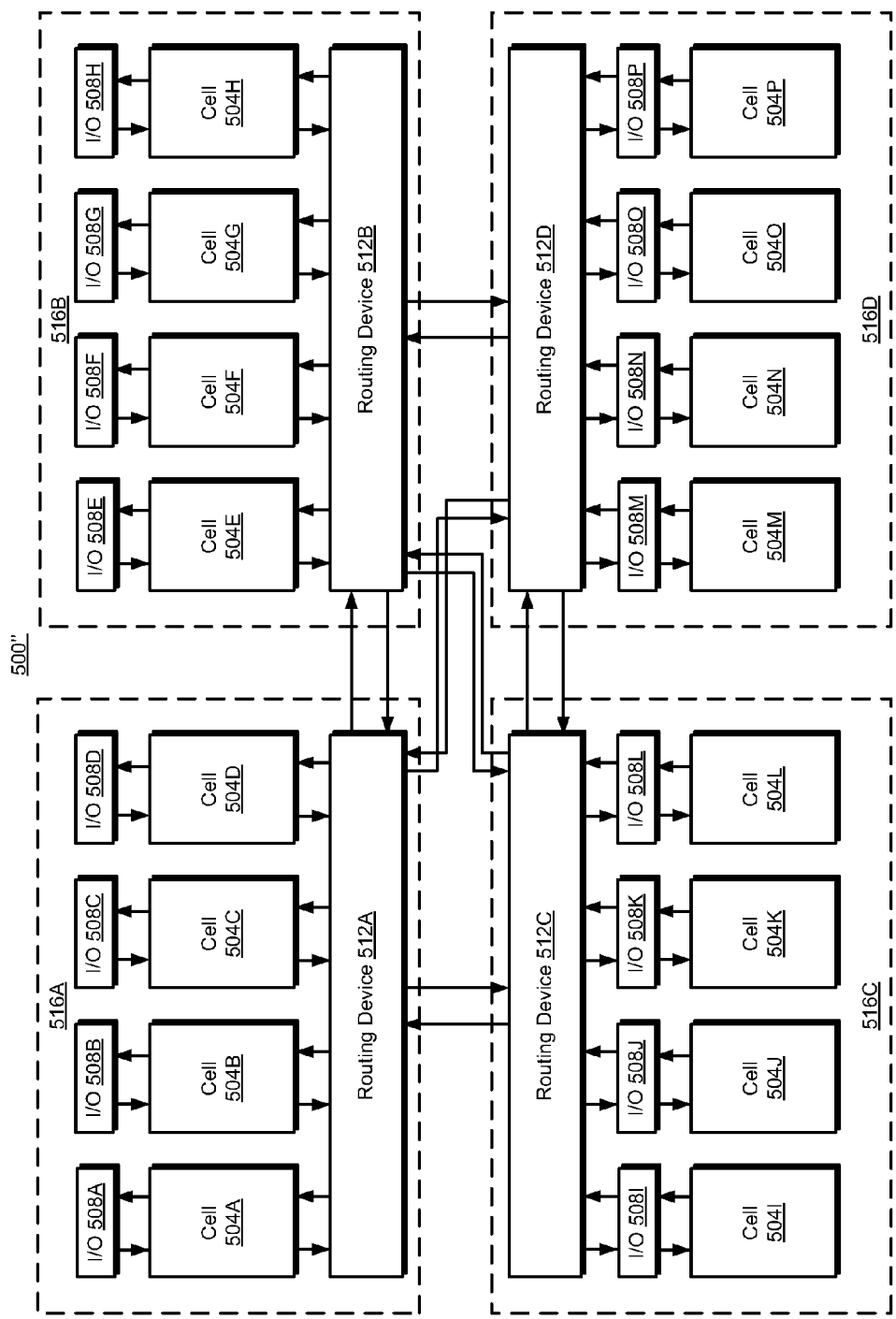

In some embodiments the computer system 100 may be implemented in a partitionable computer system. One embodiment of a partitionable computer system will be described with reference to FIGS. 5A, 5B, and 5C, a partitionable computer system 500 can include a number of elements or cells 504. In FIG. 5A, only two cells 504A and 504B are present. However, more than two cells 504 can create the partitionable computer system 500. For example, FIG. 5B depicts a partitionable computer system 500' having four cells 504A, 504B, 504C, and 504D. In FIG. 5C, sixteen cells 504A, 504B, 504C, 504D, 504E, . . . 504P, create the partitionable computer system 500". Each cell 504 can communicate with a respective input and output module 508, which is used to provide input to the system 500 and output from the system 500.

In partitionable computer systems having more than two cells 504, for example systems 500' and 500" shown in FIGS. 5B and 5C, respectively, the cells 504 can communicate with each other through a routing device 512. The routing device can be a crossbar switch or other similar device that can route data packets. For example, a NUMAflex 8-Port Router Interconnect Module sold by SGI of Mountain View, Calif. can be used. The routing device 512 facilitates the transfer of packets from a source address to a destination address. For example, if cell 504A sends a packet to cell 504D, cell 504A sends the packet to the routing device 512, the routing device 512 in turn, transmits the packet to cell 504D.

In a larger partitionable computer system, such as the system 500" shown in FIG. 5C, there can be more than one routing device 512. For example, there can be four routing devices 512A, 512B, 512C, and 512D. The routing devices 512 collectively can be referred to as the switch fabric. The routing devices 512 can communicate with each other and a number of cells 504. For example, cell 504A, cell 504B, cell 504C and cell 504D can communicate directly with routing device 512A. Cell 504E, cell 504F, cell 504G, and cell 504H can communicate directly with routing device 512B. Cell 504I, cell 504J, cell 504K, and cell 504L can communicate directly with routing device 512C. Cell 504M, cell 504N, cell 504O, and cell 504P can communicate directly with routing device 512D. In such a configuration, each routing device 512 and the cells 504 that the routing device 512 directly communicates with can be considered a partition 516. As shown, in FIG. 5C there are four partitions 516A, 516B, 516C and 516D. As shown, each partition includes four cells, however; any number of cells and combination of cells can be used to create a partition. For example, partitions 516A and 516B can be combined to form one partition having eight cells. In one embodiment, each cell 504 is a partition 516. As shown in FIG. 5A, cell 504 can be a partition 516A and cell 504B can be a partition 516B. Although the embodiment depicted in FIG. 5C has four cells, other embodiment may have more or fewer cells.

Each partition can be dedicated to perform a specific computing function. For example, partition 516A can be dedicated to providing web pages by functioning as a web server farm and partition 516B can be configured to provide diagnostic capabilities. In addition, a partition can be dedicated to maintaining a database. In one embodiment, a commercial data center can have three tiers of partitions, the access tier (e.g., a web farm), application tier (i.e., a tier that takes web requests and turns them into database queries and then responds to the web request) and a database tier that tracks various action and items.

Figure 5D:
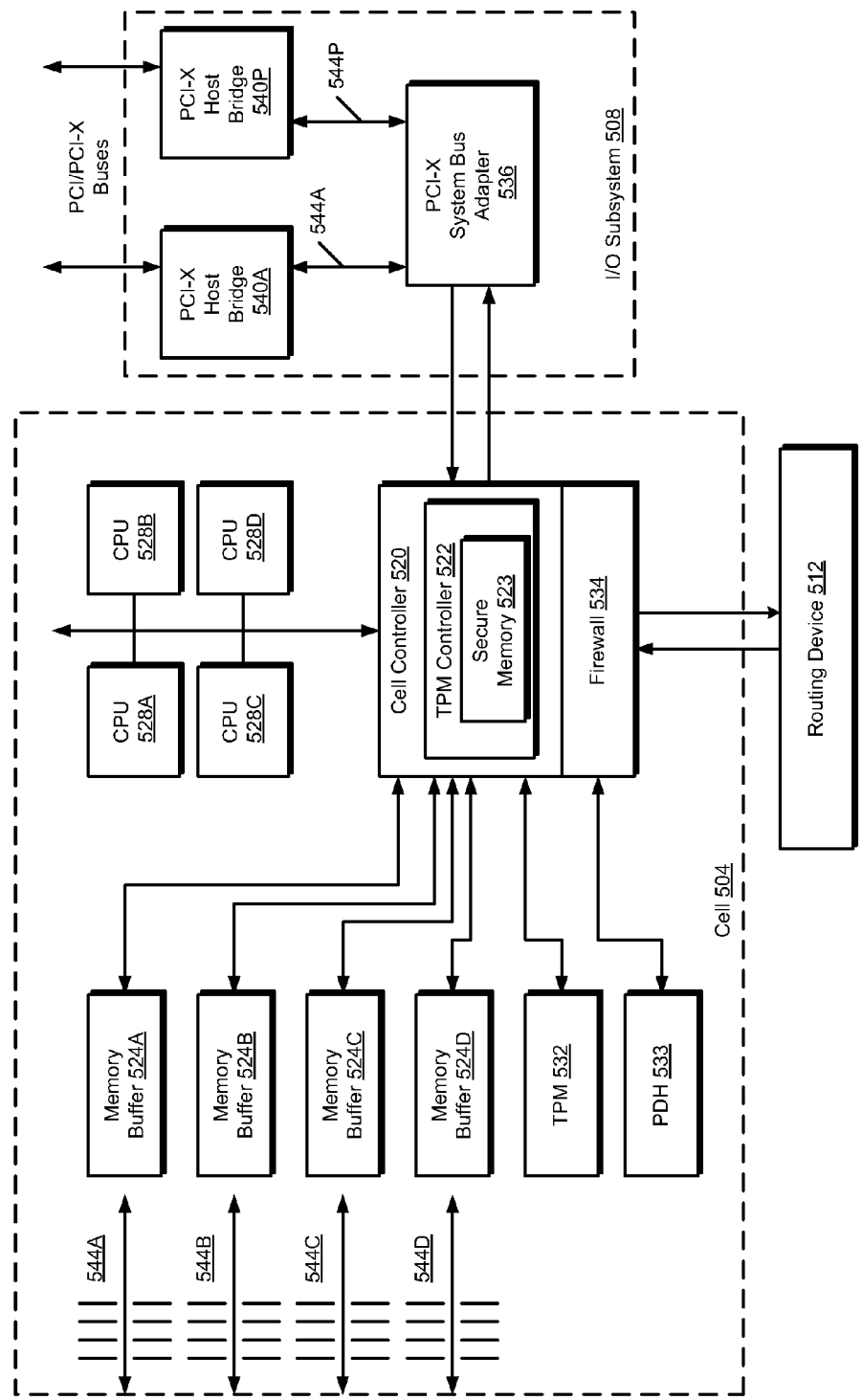
FIG. 5D is a block diagram of a cell, such as the cell depicted in FIG. 5B, according to some embodiments.

With reference to FIG. 5D, each cell 504 includes a cell controller 520, a plurality of memory buffers 524A, 524B, 524C, 524D (referred to generally as memory buffers 524), one or more central processing units (CPUs) 528A, 528B (referred to generally as CPUs 528 or processors 528), a TPM 532, a Platform Dependent Hardware (PDH) blocks 533, and a firewall 534: The term CPU is not intended to be limited to a microprocessor; instead it is intended to be used to refer to any device that is capable of processing. The memory buffers 524, CPUs 528, and TPM 532 each communicate with the cell controller 520. When the cell 504 is in communication with a crossbar 512, the cell controller 520 is also in communication with the crossbar 512. The cell controller 520 is also in communication with the I/O subsystem 508.

In some embodiments, cell controller 520 comprises a trusted platform module controller 522, which in turn comprises a memory module 523. The TPM controller 522 and a secure memory 523 may be integrated within the cell controller 520, or may be an adjunct controller coupled to the cell controller 520. The cell controller 520 and TPM controller 522, as well as a discrete TPM 532 can be any kind of processor including, for example, a conventional processor, or a field programmable gate array (FPGA). The cell controller 520 may include a communications bus (not shown) that is used to route signals between the TPM 532, the CPUs 528, the memory buffers 524, the routing device 512 and the I/O subsystem 508. The cell controller 520 also performs logic operations such as mapping main memory requests into memory DIMM requests to access and return data and perform cache coherency functions for main memory requests so that the CPU and I/O caches are always consistent and never stale.

In one embodiment, the I/O subsystem 508 includes a bus adapter 536 and a plurality of host bridges 540. The bus adapter 536 communicates with the host bridges 540 through a plurality of communication links 544. Each link 544 connects one host bridge 540 to the bus adapter 536. As an example, the bus adapter 536 can be a peripheral component interconnect (PCI) bus adapter. The I/O subsystem can include sixteen host bridges 540A, 540B, 540C, . . . , 540P and sixteen communication links 544A, 544B, 544C, . . . , 544P.

As shown, the cell 504 includes fours CPUs 528, however; each cell includes various numbers of processing units 528. In one embodiment, the CPUs are ITANIUM based CPUs, which are manufactured by Intel of Santa Clara, Calif. Alternatively, SUN UltraSparc processors, IBM power processors, Intel Pentium processors, or other processors could be used. The memory buffers 524 communicate with eight synchronous dynamic random access memory (SDRAM) dual in line memory modules (DIMMs) 544, although other types of memory can be used.

Although shown as a specific configuration, a cell 504 is not limited to such a configuration. For example, the I/O subsystem 508 can be in communication with routing device 512. Similarly, the DIMM modules 544 can be in communication with the routing device 512. The configuration of the components of FIG. 5D is not intended to be limited in any way by the description provided.

In some embodiments, a multiprocessor computer system such as the computer system depicted in FIGS. 5A-5D may utilize a trusted platform module controller 522 and a secure memory module 523 as a surrogate TPM, or in combination with an actual TPM 532. Including a secure memory and a custom TPM controller in the implementation of the TPM programming model presented to the CPU enables trusted platform module data to be portable between cells in a multiprocessor computer system. For example, in some circumstances hardware and/or software resources may need to be shifted between cells, or partitions, in a multiprocessor computer system. Accordingly, trusted platform module data associated with the cell may need to be migrated from a first cell's secure memory module to a second cell's secure memory module in the computer system.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A computer system, comprising:
   a host machine including a plurality of compute resources, said host machine being on a host power domain running the plurality of compute resources of the host machine;
   at least one persistent state data store location coupled to the host machine, wherein the persistent state data store location stores hypervisor configuration data for a hypervisor of a type that instantiates virtual machines on the host machine utilizing the plurality of compute resources of the host machine;
   at least one management processor, included in the host machine, running on an auxiliary power domain that permits the management processor to run while the host power domain of the host machine is off, the management processor including a persistent state module coupled to the host machine that modifies the hypervisor configuration data in the persistent state data store location; and
   wherein the persistent state module allows the hypervisor configuration data stored in the persistent state data store location to be modified based on a request received to modify the hypervisor configuration data when the host power domain of the host machine is off.

2. The computer system of claim 1, wherein the persistent state module is coupled to the host machine through nonvolatile flash memory on the management processor.

3. The computer system of claim 1 further comprising said hypervisor, which, when the host machine is powered up, reads the hypervisor configuration data in the persistent state data store location.

4. The computer system of claim 1, wherein the hypervisor configuration data modification request is received from a user and implemented by the persistent state module.

5. The method according to claim 4, wherein the hypervisor configuration data modification request is received from an external software program and implemented by the persistent state module.

6. A method to edit configuration data of a hypervisor comprising:
   executing a persistent state module on a management processor running on an auxiliary power domain, wherein a host machine includes the management processor running on the auxiliary power domain and a plurality of compute resources running on a host power domain;
   receiving, by the persistent state module, a hypervisor configuration data modification request to modify configuration data for a hypervisor of a type that instantiates virtual machines on the host machine utilizing the plurality of compute resource of the host machine while the host machine power domain is in off mode, wherein the hypervisor configuration data is stored in a persistent state data store coupled to the host machine;
   reading, by the persistent state module, current hypervisor configuration data from the persistent state data store coupled to the persistent module on the host machine;
   modifying, by the persistent state module, the current hypervisor configuration data in accordance with the modification request to yield modified hypervisor configuration data; and
   writing, by the persistent state module and while the host machine is still off, the hypervisor configuration data to the persistent state data store.

7. The method of claim 6 further comprising:
   monitoring hypervisor configuration data, by the hypervisor, when the host machine is powered up;
   receiving, by the hypervisor while the host machine is on, a second hypervisor data modification request; and
   modifying, by the hypervisor, hypervisor configuration data in the persistent state data store when a modification is detected.

8. The method according to claim 6, wherein receiving, in the host machine, the hypervisor configuration data modification request includes receiving the request by the persistent state module on the management processor when the host machine is in an auxiliary power mode.

9. The method according to claim 6, wherein receiving, in the host machine, the hypervisor configuration data modification request includes receiving the request from a user.

10. The method according to claim 6, wherein receiving, in the host machine, the hypervisor configuration data modification request includes receiving the request from an external software program.

11. The method according to claim 7, wherein receiving, in the host machine, the second hypervisor configuration data modification request includes receiving the request from a flash memory device added to the computer system replacing earlier hypervisor configuration data on the persistent state data store.

12. The method according to claim 11, wherein the persistent state module on the management processor grants priority to the later added flash memory hypervisor configuration data over embedded hypervisor configuration data.

13. A computer program product comprising logic instructions stored on a non-transitory computer-readable medium which, when executed by a computer processor, cause the processor to:
  execute a persistent state module on a management processor running on an auxiliary power domain, wherein a host machine includes the management processor running on the auxiliary power domain and a plurality of compute resources running on a host power domain;
  receive, by the persistent state module in the host machine, a hypervisor configuration data modification request for modifying configuration data of a hypervisor of a type that instantiates virtual machines on the host machine utilizing the plurality of compute resource of the host machine while the host machine power domain is in off mode, wherein the hypervisor configuration data is stored in a persistent data store coupled to the host machine;
  read, by the persistent state module in the host machine, the current hypervisor configuration data from the persistent state data store coupled to the persistent state module on the host machine;
  process, by the persistent state module in the host machine, the hypervisor configuration data modification request; and
  write, by the persistent state module in the host machine, the edited hypervisor configuration data to the persistent state data store coupled to the persistent state module on the host machine.

14. The computer program product of claim 13, further comprising logic instructions stored in the non-transitory computer-readable medium which, when executed by the processor, cause the processor to:
  monitor hypervisor configuration data, by the hypervisor, when the host machine is powered up; and
  modify, by the hypervisor, the hypervisor configuration data when a modification is detected.

15. The computer program product of claim 13, wherein the hypervisor configuration data modification request is received by the persistent state module on the management processor when the host machine is in auxiliary power mode.

16. The computer program product of claim 13, wherein the hypervisor configuration data modification request is received from a user.

17. The computer program product of claim 13, wherein the hypervisor configuration data modification request is received from an external software program.

18. The computer program product of claim 13, wherein the hypervisor configuration data modification request is received from a flash memory device added to the computer system replacing an earlier hypervisor configuration data on the persistent state data store.

19. The computer program product of claim 18, wherein the persistent state module on the management processor grants priority to the later added flash memory hypervisor configuration data over embedded hypervisor configuration data.

* * * * *

UNITED STATES PATENT AND TRADEMARK OFFICE
CERTIFICATE OF CORRECTION

| | | |
|---|---|---|
| PATENT NO. | : 8,595,723 B2 | Page 1 of 1 |
| APPLICATION NO. | : 12/997002 | |
| DATED | : November 26, 2013 | |
| INVENTOR(S) | : Michael R. Garrett et al. | |

It is certified that error appears in the above-identified patent and that said Letters Patent is hereby corrected as shown below:

In the Claims

Column 9, line 64, in Claim 1, delete "system," and insert -- system --, therefor.

Column 10, line 31, in Claim 5, delete "method according to" and insert -- computer system of --, therefor.

Column 10, line 52, in Claim 6, after "persistent" insert -- state --.

Column 10, line 58, in Claim 6, before "hypervisor" insert -- modified --.

Column 11, line 40, in Claim 13, after "machine;" insert -- and in a power domain different and separate from a power domain of the host machine; --.

Column 12, line 5, in Claim 13, delete "process," and insert -- modify, --, therefor.

Column 12, line 6, in Claim 13, before "hypervisor" insert -- current --.

Column 12, line 6, in Claim 13, after "data" insert -- in accordance with the --.

Column 12, line 6, in Claim 13, delete "request;" and insert -- request to yield modified hypervisor configuration data; --, therefor.

Signed and Sealed this
Twenty-fifth Day of February, 2014

Michelle K. Lee
*Deputy Director of the United States Patent and Trademark Office*